United States Patent Office 3,459,499
Patented Aug. 5, 1969

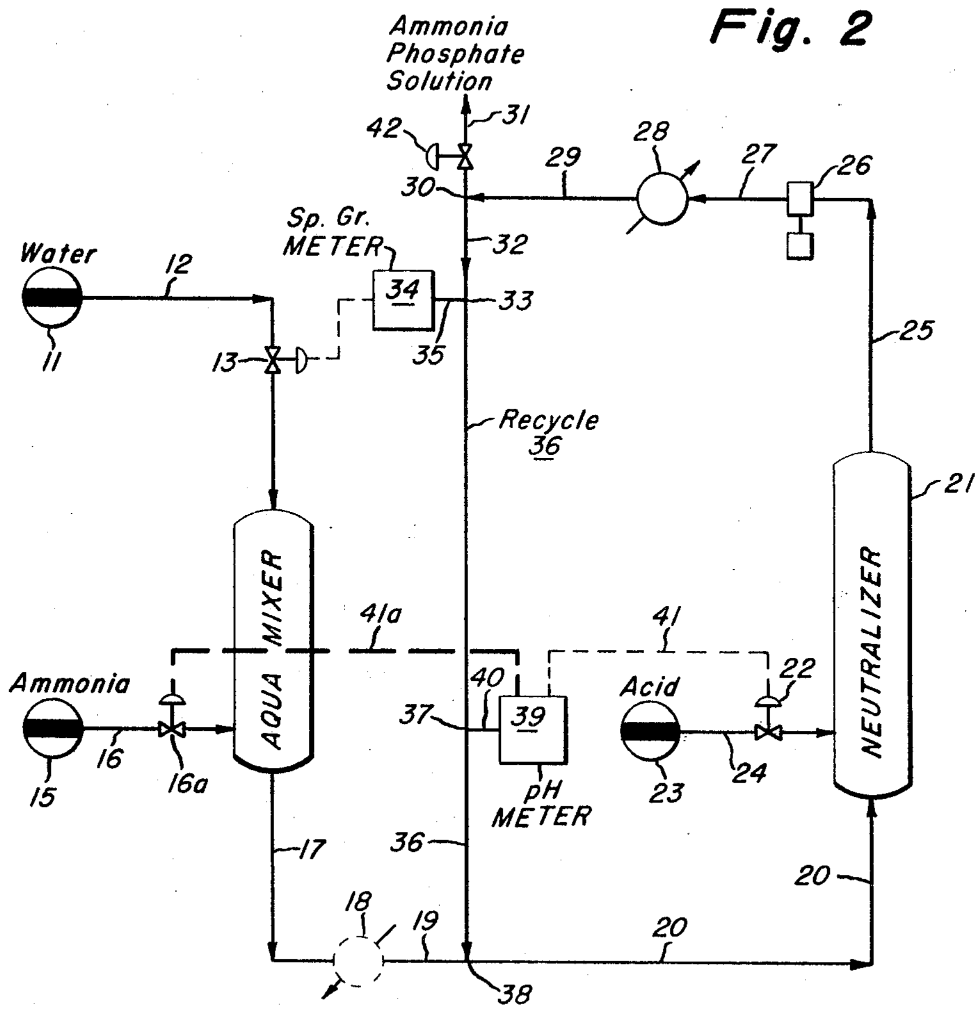
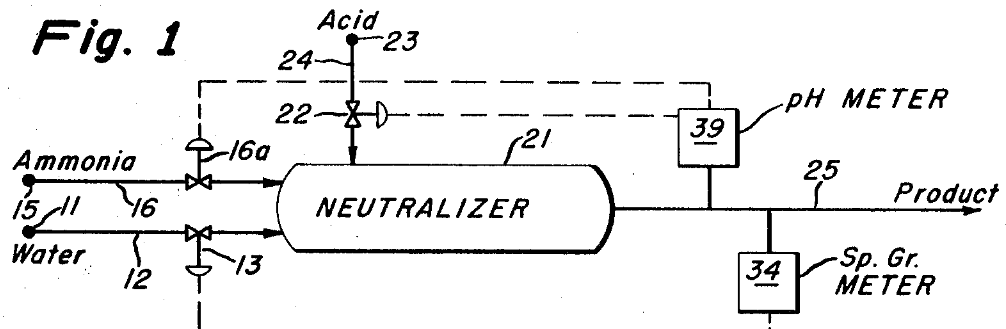
INVENTOR
George Clarence Mullen, Jr.
BY Edwin C. Lehner
ATTORNEY INVENTOR.
George Clarence Mullen, Jr.
BY Edwin C. Lehner
ATTORNEY

3,459,499

METHOD FOR THE CONTINUOUS PREPARATION OF AN AQUEOUS AMMONIATED PHOSPHATE COMPOSITION

George Clarence Mullen, Jr., Tulsa, Okla., assignor to Standard Oil Company, Chicago, Ill., a corporation of Indiana Filed Apr. 29, 1966, Ser. No. 546,411
Int. Cl. C01b *25/28;* C05b *11/10*
U.S. Cl. 23—107 4 Claims

ABSTRACT OF THE DISCLOSURE

Aqueous ammonium phosphate plant nutrients are prepared by the continuous process wherein ammonia and wet-process phosphoric acid are reacted after first being introduced into a turbulent, aqueous stream. The acid is added subsequent to and downstream from the point of introduction of the ammonia, thereby ensuring that the reaction environment is basic. Reaction conditions are carefully controlled so that after the ammonium phosphates are formed enough polyphosphate ions, which are initially present in the acid, are available to sequester any metal impurities which may be present in the finished composition.

This invention relates to method and apparatus for the continuous preparation of stable aqueous ammoniated phosphate compositions suitable for use as plant nutrients.

Phosphoric acid is generally produced by one of two well known methods. Furnace-grade phosphoric acid is produced by burning phosphorous with air to produce phosphorous anhydride. The phosphorous anhydride is then subjected to hydration to produce phosphoric acid having a concentration dependent upon the amount of water added during hydration. Thus, the concentration of the furnace-grade acid can be varied over a wide range by controlling the water content.

In contrast, crude wet-process phosphoric is produced by treating phosphate rock with sulphuric acid. This reaction produces a dilute acid having a concentration of about 30% $P_2O_5$. The 30% $P_2O_5$ acid can be heated to evaporate and concentrate the solution to about 50% $P_2O_5$. The concentrated phosphoric acid having about 50% $P_2O_5$ can be further evaporated to produce superphosphoric acid which has a concentration of about 68% $P_2O_5$ or more.

The dilute and concentrated phosphoric acids contain a large amount of orthophosphoric acid. The super acid contains a mixture of orthophosphoric acid, pyrophosphoric acid, and higher polyphosphoric acids which are produced as free water is driven off to molecularly dehydrate the orthophosphoric acid to form pyrophosphoric acid and other polyphosphoric acids. For example, two molecules of orthophosphoric acid combine to form pyrophosphoric plus water when heat is applied as shown below:

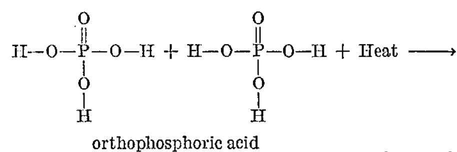

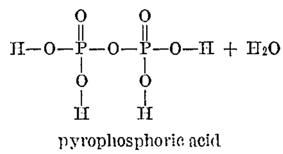

When concentrating wet-process phosphoric acid to the super acid concentration range of about 68–80% $P_2O_5$, at least 35% of the orthophosphoric acid must be converted to the non-ortho form. Some of the pyrophosphoric acid formed then reacts with another molecule of the orthophosphoric acid to form tripolyphosphoric acid as shown below:

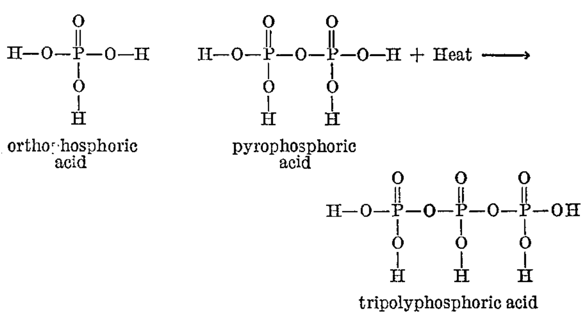

The various methods of producing crude wet-process and furnace-grade phosphoric acids including the respective super acids are well known in the art. Similarly, it is well known that the crude wet-process phosphoric acids contain substantial levels of congeneric impurities absent from the more expensive furnace-grade phosphoric acids. These impurities include normally insoluble polyvalent metals that tend to precipitate during the molecular dehydration of the commercial grade of concentrated crude wet-process phosphoric acid. Consequently, the substantially impurity-free furnace-grade acids, and particularly the super acid containing about 68% $P_2O_5$ or more is produced without the problem of precipitation of metallic impurities.

In the concentration of wet-process acid to the super acid, the orthophosphoric form of the acid is purposely transformed to the other acid forms such as pyro, tri, tetra, etc., for the well known reason that the metallic impurities contained in the crude acid are sequestered. For instance, when dilute or concentrated crude wet-process phosphoric acid is subjected to dehydration to ultimately obtain superphosphoric acid, that is, a higher concentration of $P_2O_5$ using known methods for preventing the formation of insoluble precipitates, the acid in this form is a mixture of $H_3PO_4$ (ortho), $H_4P_2O_7$ (pyro), and other polymerized acid complexes which have the ability to sequester the congeneric polyvalent metal impurities, thereby preventing the coalescence of the impurities during dehydration. Apparently, this sequestering ability of superphosphoric is related to the ability of the pyrophosphate and polyphosphate ions to combine with normally insoluble metal salts to form soluble chelates. Consequently, the retention of the sequestering power of superphosphoric acid depends upon the continued maintenance of the pyrophosphate and polyphosphate ions in the acid solution.

It is also well known in the art that when ammonia is used to neutralize phosphoric acid, an ammonium phosphate composition results. If ammonia and wet-process superphosphoric acid are mixed in the neutralizing process, the impurities inherently present in the crude acid can cause the formation of a gelatinous precipitate which destroys the advantageous handling properties normally incident to a non-precipitating, clear liquid solution.

In the manufacture of ammonium phosphate by neutralizing crude wet-process superphosphoric acid with ammonia, it is critical that the sequestration ability of the superphosphoric acid be maintained at a high level through the control of characteristics and conditions of the solution and the system in which the ammonium phosphate is produced; since, the ability of the acid to sequester the normally insoluble metals depends upon the retention of the non-orthophosphate forms in the solution. In order to accomplish the efficient continuous production of ammonium phosphate composition in a continuous manner within a system, the solution of problems of control and maintenance of pressure, temperature, pH, specific gravity, rate of flow, and the proportions of constituents are important. The art discloses that ammonium phosphate can be produced by neutralizing phosphoric acid with ammonia in various apparatuses open to the atmosphere; however, the loss of ammonia through vaporization and the lack of temperature control create neutralization and precipitation problems and result in polyphosphate losses.

The prior art, including patents to Reusser et al. No. 3,057,711; Young No. 3,044,851; Striplin et al., No. 3,015,552; Wordie et al., No. 2,792,286 and No. 2,799,569, and British Patent No. 1,001,984 to Bookie et al. concern the neutralization of phosphoric acid and the production of phosphate compositions in an in situ formed metal sequestering system wherein the neutralization reaction occurs through the addition of a basic solution to a bulk acid. In contrast, the invention described and claimed herein continuously neutralizes phosphoric acid through the addition of acid to an excess basic aqueous reaction medium containing an excess of polyammonium phosphate ions.

Major obstacles have always existed in present methods and apparatuses used in manufacturing liquid ammonium phosphate in the inability to develop processes and systems for the continuous efficient ammoniation of phosphoric acid wherein the loss of ammonia by vaporization and the loss of non-orthophosphate forms are minimized. Furthermore, additional problems reside in the lack of control of environmental conditions and constituent characteristics which result in hydrolysis and the attendant formation of mono-ammonium phosphates and di-ammonium phosphates which have a lower solubility. The formation of these mono- and particularly the di-ammonium phosphates also raise the salting-out temperature of the solution, and the normally insoluble metals held in solution as soluble chelates tend to precipitate.

Other problems currently exist due to the lack of control of temperature within a system and particularly within the area where neutralization takes place. Presently known processes and equipment are unable to cope successfully with the high temperatures generated by the superphosphoric acid neutralization reaction which often causes precipitate formation and frequent material problems in the apparatuses as a result of corrosiveness. Additional problems in existing methods and apparatus reside in the inability to maintain suitable concentrations of constituents and properly mixed pH controlled neutralizations. These problems cause poor stability in the final fertilizer product, and they result in irregular and uncertain liquid analyses which by law are required to be guaranteed to the consumer.

It is, therefore, the primary object of this invention to provide apparatus and method for converting phosphoric acids and ammonia to liquid ammonium phosphate compositions having the desired uniform analyses and characteristics in a manner in which there is retained a substantial amount of the non-orthophosphate forms.

An additional object of this invention is to provide method and apparatus for producing stable liquid ammonium phosphate compositions wherein temperatures are effectively controlled.

Another object of this invention is to provide method and apparatus for producing stable liquid ammonium phosphate plant nutrient solutions wherein the vaporization losses of ammonia are substantially eliminated.

An additional object of this invention is to provide an improved simple flexible system free from temperature and corrosion induced material problems wherein an excess of free water is excluded from the neutralization reaction and temperature, pH, and constituent concentration is maintained in a manner which yields a stable liquid fertilizer product having the desired analysis.

It has been discovered that when a large dynamic body of ammonium phosphate solution is first subjected to the introduction of quantities of an ammoniating fluid small in comparison to said body of ammonium phosphate solution followed by the introduction of small quantities of phosphoric acid to the substantially alkaline phosphate at a point remote from the introduction of said ammoniating fluid, there is produced superior ammonium phosphate compositions having improved characteristics of solution stability wherein the retention of said fluid and a large amount of the polyphosphate forms are maintained. The continuous process of producing the stable ammonium phosphate solutions can be carried out in a closed system and at least one of the remotely introduced constituents can be quantitatively introduced through pH or specific gravity responsive metering means. The ammoniating fluid can be liquid or gaseous ammonia or an ammonium phosphate solution made alkaline by the introduction of said liquid or gaseous ammonia.

The accompanying drawings illustrate the preferred embodiments of this invention; however, it is understood that the specific details of the system may vary widely without departing from the basic principles of the invention wherein:

FIG. 1 is a schematic diagram of this system and particular apparatus for continuously ammoniating phosphoric acid;

FIG. 2 is a schematic diagram of a system including a recycle stream;

Figure 3:
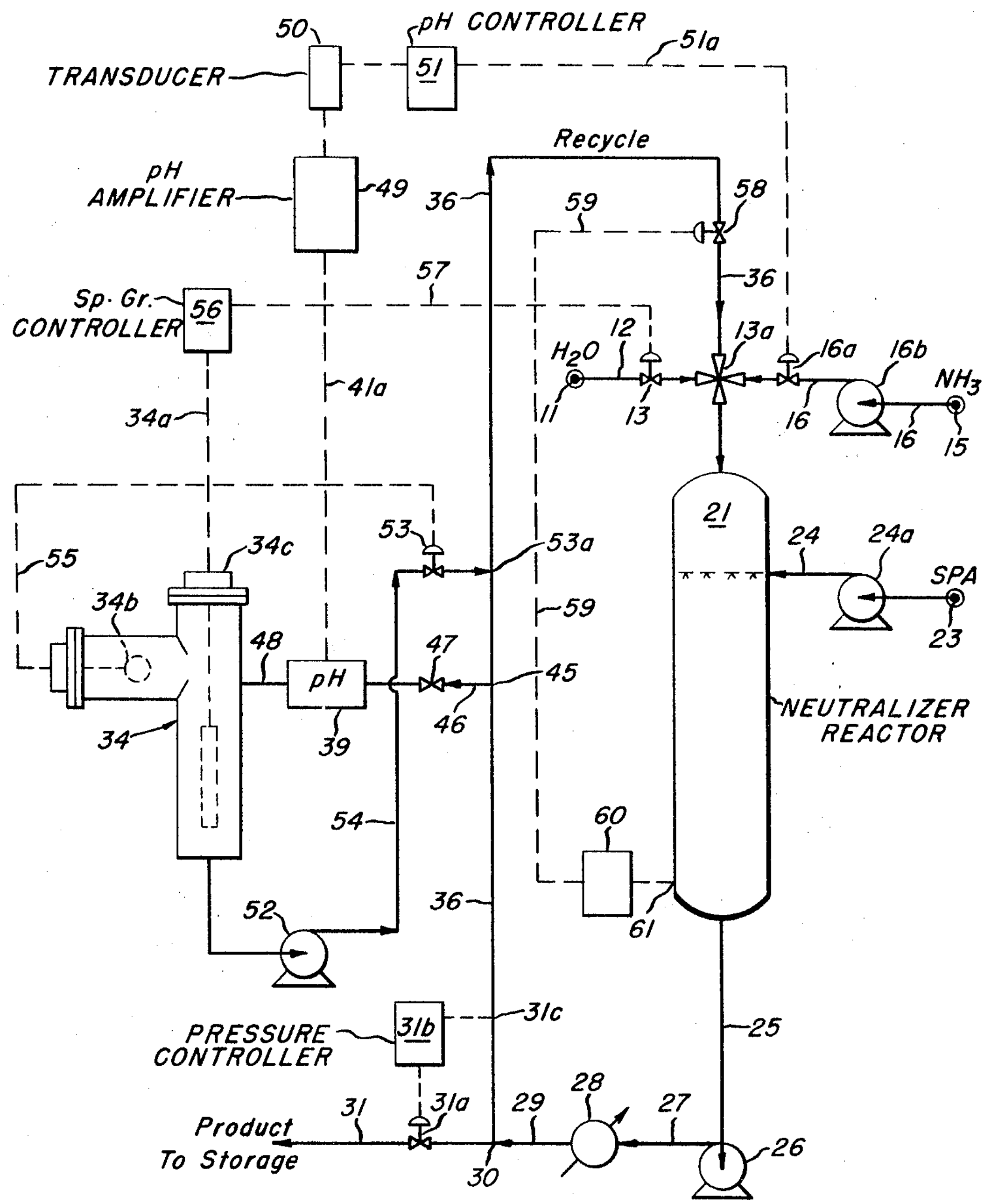
FIG. 3 is a schematic diagram of a further embodiment of a system including a recycle stream.

Referring to FIG. 1 of the drawing, the ammonia feed line 16 is connected to neutralizer 21 through ammonia feed control valve **16*a* which is electrically connected to pH meter 39 through conductor means 41*a*. Water feed line 12 extending to neutralizer 21 has water feed line valve 13 which is electrically connected to specific gravity meter 34 by conductor means 34*a*. Product effluent line 25 extends downstream from neutralizer 21 through pH meter check point 37 which is connected to pH meter 39 by line 40. Product line 25 also extends through hydrometer station 33 which is connected to specific gravity meter 34 by line 35**.

With reference to FIG. 2, the numeral 11 designates a water storage tank or means having pipeline 12 extending therefrom through water control valve 13 to the aqua mixer 14. The ammonia storage tank 15 communicates through line 16 with the aqua mixer 14, and line 17 extending therefrom joins with cooler 18. Cooler 18 may be used if the anhydrous ammonia is in the gas phase when it enters mixer 14 from tank 15 through line 16 since higher than usual temperatures are generated. Extending from cooler 18 is line 19 which joins recycle line 36 and line 20 at recycle T 38. Line 20 extends from T 38 to neutralizer vessel 21 and acid vat 23 communicates with vessel 21 through pH metering valve 22 and line 24. Vessel 21 is joined with cooler 28 through recycle pump 26 and product effluent lines 25 and 27. Line 29 extends from cooler 28 to a junction where T 30 has product drawoff, line 31, and the commencement of diverging recycle line 32 which extends to hydrometer station 33. Hydrometer station 33 communicates with hydrometer 34 through line 35. Recycle line 36 extends through pH meter check point 37 to recycle T 38. pH meter check point 37 communicates with meter 39 through line 40. Hydrometer 34 communicating with the recycle lines 32 and 36 at station 33 is electrically connected to water metering valve 13 through conductor means **34*a*, and pH meter 39 communicating with recycle line 36 through line 40 at check point 37 is electricaly connected to acid metering valve 22 by conductor means 41**.

Referring to FIG. 3, water storage vessel 11 is connected through specific gravity responsive metering valve 13 and line 12 to mixing valve 13*a* in recycle line 36. Ammonia storage tank 15 communicates via line 16 through pump 16*b*, pH responsive metering valve 16*a* to mixing valve 13*a* in recycle line 36.

Recycle line 36 communicates with the top of neutralizer 21. Acid vat 23 is connected via line 24 through pump 24*a* with neutralizer 21 at a point substantially below the upper portion of said neutralizer. At the lower end of neutralizer 21 effluent line 25 communicates with recycle pump 26 which is connected with cooler 28 by a flow line 27. Cooler effluent line 29 communicates with T 30 from which extends product drawoff line 31 which is connected to metering means 31*a*, pressure responsive control 31*b*, and recycle line 36 at 31*c*.

Recycle line 36 is connected at sampling station 45 with pH metering means 39 through line 46 and valve 47. pH Metering means 39 is connected to specific gravity measuring means 34 by sample flow line 48. pH Meter 39 is electrically connected by conductor means 41*a* with pH amplifier 49 to transducer 50 and pH controller 51 which communicates with pH responsive ammonia metering valve 16*a* via line 51*a*.

Specific gravity measuring means 34 communicates with recycle line 36 through pump 52 and specific gravity liquid level responsive control valve 53 via sample return line 54.

Specific gravity metering means 34 is conneceted with liquid level control valve 53 by communicating means 55 from level arm 34*b*. Specific gravity measuring means 34 is also connected to specific gravity controller 56 by conductor 34*a* from meter head 34*c*. Specific gravity controller 56 communicates with specific gravity responsive control means 13 through line 57.

Recycle line 36 passes through sampling station 45, sample return point 53*a*, and temperature responsive recycle control valve 58. From valve 58 conductor means 59 extends through temperature controller 60 to the effluent end portion 61 of neutralizer 21.

In operation, the system shown in FIG. 1 delivers ammonia and water through lines 16 and 12, respectively, into the upstream end of neutralizer vessel 21 where the water and ammonia are thoroughly mixed to form a basic molecular ammonium hydroxide mixture which is introduced into a large body of ammonium polyphosphate solution which becomes a substantially basic reacting medium. Depending upon the outside temperature, the pressure in the ammonia storage tank 15 and line 16 can be 150 p.s.i.g. or higher as long as the pressure of the ammonia exceeds the system pressure. If the atmospheric temperature is unusually high and the ammonia is delivered to the inlet of neutralizer 21 in a gaseous fluid state, the cooling means which can be any of the well known types of heat exchangers within neutralizer vessel 21 will function to reduce the temperature, thereby allowing all of the ammonia to go into solution with water to form a basic molecular ammonium hydroxide solution. Excessive heating of the ammonia prior to its mixing with water causes the ammonia water reaction to be driven to the left and the ammonia volatilizes.

When a liquid ammoniating fluid is introduced into the reacting medium and the ammonia volatilizes, the vapor out of the solution causes a condition known as collapse characterized by mild explosions. It is believed that collapse retards the dispersion of ammonia throughout the medium and thereby inhibits the rate of neutralization when acid is introduced into the basic reacting medium. The problem of collapse is avoided in the embodiments of the instant systems shown in FIGS. 1, 2, and 3, because of the inherent ability to regulate pressures and temperatures within these novel closed systems which eliminate the volitalization of ammonia from the liquid medium.

The initial charge in the closed system is produced by slowly mixing water and ammonia at the inlet end of neutralizer 21 followed by the temperature controlled addition of phosphoric acid to the aqueous ammonia to produce the large body of basic ammonium phosphate solution. This solution then functions as a reacting medium and as ammonia and water are added to continuously produce more product upon the addition of acid to the basic medium at a point remote from the introduction of the base, the system is in operation to continuously produce a stable ammonium polyphosphate plant nutrient solution product.

Water from storage tank 11 is introduced into the inlet neutralizer 21 through line 12 and valve 13 where the water is contacted with ammonia in the reacting medium and thoroughly mixed with it prior to acid introduction and neutralization. The water can be ordinary well water, preferably having a metal content of less than 600 parts per million. After the ammonia and water in amounts which have previously been determined in accordance with the desired analysis of the final ammonium phosphate solution product have been thoroughly mixed to form a substantially basic reacting medium, the aqueous ammonia is contacted with acid which is introduced into the large body of basic reacting medium from vat 23 through line 24 to neutralizer 21 at a point remote and downstream from where ammonia and water are initially delivered to vessel 21.

The neutralization reaction between the aqueous ammonia and the phosphoric acid takes place in the reacting medium within neutralizer vessel 21 very quickly. It is preferred that the neutralization reaction be carried out within the vessel 21 so that the neutralized effluent has a temperature within the range of about 70–225° F., preferably about 150–180° F., in order to prevent the destruction of the polyphosphate ions. The pool of ammonium polyphosphate within the neutralizer vessel 21 acts as a reacting medium for the ammonia-water reaction and becomes substantially basic prior to the neutralization reaction. This alkaline body of reacting medium large in comparison to the amounts of materials reacted probably acts as a diluent and a dispersant to produce less heat and to assist in the dissipation of heat during the exothermic neutralization reaction.

It is not fully understood why the addition of acid to the substantially basic reacting medium which has been formed by the introduction of ammonia to the ammonium phosphate solution at a point remote from the point of introduction of the acid produces a stable ammonium phosphate solution fertilizer; however, it is belived that by first forming the ammonium phosphate solution followed by the addition and dispersion of the ammonia to form a large alkaline medium that the subsequent addition of acid inhibits the loss of polyphosphate forms and retards the rate of hydrolysis. Consequently, it is important that the combining of ammonia with the ammonium phosphate solution be carried out in a zone with thorough mixing and temperature control and that the subsequent introduction of acid at a point remote from the introduction of ammonia be also carried out with thorough mixing of the components in a zone having nonstriated turbulence and temperature control within the neutralizer vessel 21 to minimize the losses of the polyphosphate forms. Satisfactory preservation of the non-orthophosphate forms is similarly experienced when a mixed acid containing in part superphosphoric with a wet-process concentrated phosphoric; however, in relation to the tenor of this disclosure, the water requirements when mixed acids are used can be varied accordingly.

When the neutralization vessel 21 of FIG. 1 has been initially charged with ammonia, water, and finally acid to form a neutralized reaction product within the reacting medium and the controlled environment of the vessel, the effluent product stream 25 flows bp pH check point 37 and hydrometer station 33. Meter 39 communicating with check point 37 via line 40 continuously measures the pH of the effluent product and programmed signals are directed via either conductor means 41 or 41a to acid control valve 22 or ammonia control valve 16a. The pH meter 39 is alternately programmed for the control of the rate of flow of either ammonia or acid. When the control of acid is desired based upon the variations of pH of the effluent product stream, conductor means 41a and ammonia valve 16a are deactivated so that ammonia flows into the neutralizer at a predetermined constant rate. Conversely, if it is desired that the rate of flow of ammonia be based upon and respond to measured variations in the pH of the effluent product stream 25, conductor means 21 and acid control valve 22 are deactivated and the acid is delivered to the neutralizer through line 24 and valve 22 at a predetermined constant rate. Although the acid feed line rate of flow or the ammonia feed line rate of flow responds to measured pH values of the effluent product as shown in the drawing as alternative operable design configurations, it is preferred that the variations in the amount of ammonia delivered to neutralizer 21 be in response to signals generated by measured pH variations in the effluent product stream passing check point 37. Consequently, acid delivered to neutralizer 21 through line 24 and valve 22 will be at a predetermined constant rate not responsive to pH meter signals through deactivated conductor 41.

When a constant rate of flow of acid is delivered to the neutralizer, the total aqueous ammonia formed in the reacting medium in vessel 21 is positively controlled by pH meter responsive ammonia control valve 16a and hydrometer responsive water control valve 13.

Specific gravity meter 34 continuously measures the density of the effluent solution product passing hydrometer station 33, and these variations in measured density of the effluent ammonium phosphate solution product are transmitted via conductor means 34a to density responsive water control valve 13. Consequently, in this novel method and apparatus for continuously ammoniating phosphoric acid, the combination of constant acid introduction into a basic ammonium phosphate reacting medium and product density responsive water to the reacting medium provide a unique and simple scheme for accomplishing the objectives herein described.

Referring now to the embodiment portrayed in FIG. 2, the system in operation delivers water from tank 11 through line 12 and valve 13 to the aqua mixer 14 where ammonia from tank 15 is introduced through line 16 and valve 16a to mixer 14. The highly soluble ammonia mixed with the water apparently forms a weakly basic molecular ammonium hydroxide which is circulated from aqueous ammonia effluent line 17 through cooler 18 for cooling, if temperatures are sufficiently high to volatilize the ammonia. Subsequently, the aqueous ammonia is carried via line 19 and recycle T 38 to line 20 which contains a large amount of recycled ammonium phosphate and reacting medium. The reacting medium containing the weak base is carried to neutralizer 21 where the phosphoric acid from vat 23 is introduced through line 24, and valve 22 to the reacting medium in vessel 21. The neutralization reaction takes place in vessel 21 within the large body of the reacting medium. After the reactants have been introduced at remote points and the reacted ammonium polyphosphate solution is transported via effluent stream 25 through recycle pump 26, line 27, and cooler 28 to T 30. At T 30 product can be drawn off through drawoff line 31 and part or all the product can be shunted into recycle stream 36 where the recycle product solution passes hydrometer station 33. Continuous specific gravity monitoring of recycle stream 36 occurs at station 33 via line 35, and the specific gravity meter 34 transmits signals through conductor 34a to recycle density responsive water valve 13 which adjusts the rate of flow of water delivered to mixer 14 in a predetermined relation to density variation and desired final product requirements.

Recycle product stream 36 flows through pH meter check point 37 to recycle T 38. At pH check point 37, pH meter 39 continuously measures the recycle pH via connection 40 and the measured pH variation generates signals transmitted through either conductor means 41 or 41a to recycle pH responsive values 22 or 16a for control and adjustment of the rate of flow of either the acid to neutralizer 21 or the ammonia to mixer 14. If pH meter 39 controls the rate of flow of acid to vessel 21, conductor 41a and pH responsive valve 16a are deactivated and ammonia enters mixer 14 at a predetermined constant rate in accordance with the analysis desired in the final product.

Although either the introduction of acid or ammonia through a pH responsive valve operates satisfactorily, it is preferred to deactivate conductor 41 and valve 22, thus allowing acid to be delivered to the reacting medium in vessel 21 at a predetermined constant rate of flow. Utilizing this design configuration, water and ammonia are metered to mixer 14 by recycle density responsive water valve 13 and recycle pH responsive ammonia valve 16a and the amount of each of these constituents delivered to the system depends upon the pH and density of the ammonium phosphate solution recycle stream. This embodiment permits the controlled introduction of water and ammonia into the system as a function of the condition of the recycle product stream reacting medium while a constant amount of acid is introduced into the large body of the alkaline reacting medium. The aqueous ammonia enters the recycle stream at T 38 and is dispersed and is carried in the large dynamic body of reacting medium through line 20 into neutralizer 21 where the phosphoric acid is introduced into said body under controlled density, pH, and temperature conditions. For example, if it is desired to produce a fertilider having an N–P–K (nitrogen-phosphorous-potash) analysis of 10–34–0, it is preferred to maintain a pH of the reacting medium recycle stream within the range of about 5.8 to 6.3 and a specific gravity of the reacting medium within the range of about 1.34 to 1.41 at about 100° F.; however, the density, pH, and relative constituent concentration conditions existing in the recycle stream are the same as the analysis desired in the final tailored fertilizer product. If other product analyses are desired, pH and specific gravity values can be adjusted and controlled in the system accordingly.

The flexibility of this system resides in the various methods for maintaining control of the amounts of constituents introduced in response to pH and specific gravity monitoring and temperature. Temperature within the system in the embodiment illustrated by FIG. 2 may be controlled primarily by the rate of recycling of the solution product. The large body of the reacted product which is recycled provides a reacting medium for the neutralization reaction wherein the reactants are introduced into the medium at remote points. Variable recycle pump 26 in conjunction with cooler 28 may be coordinated to accomplish temperature control within the system. It is preferred that the temperature of the effluent fertilizer product out of neutralizer 21 be maintained within the range of about 70–225° F., preferably 150–180° F. Recycle pump 26 develops a pressure up to about 50 p.s.i.g. and a reactor inlet pressure is maintained on the system of at least 15 p.s.i.g. Cooling, if needed, can be supplied to the aqueous ammonia by cooler 18 to maintain solubility of the ammonia in water before the neutralization reaction.

The apparatus depicted in FIG. 3 includes a neutralizer 21, a recycle stream 36 and other apparatuses similar to those shown in FIGS. 1 and 2 and they bear similar numerical designations.

The FIG. 3 embodiment portrays a system which in operation provides for the initial introduction of water and ammonia from tanks 11 and 15, respectively, to mixing valve 13a located in recycle stream 36. To initially charge the system, water and ammonia are introduced from the mixing valve and recycle stream into the upper end of neutralizer 21 and to mixing and passage down the neutralizer to a point remote from the initial introduction where the aqueous ammonia is subjected to phosphoric acid to produce with thorough mixing, and temperature control an ammonium phosphate solution. As the reacted product passes downward through neutralizer 21 with continued mixing and temperature control, the effluent passes into line 25 where temperature is maintained between 70 and 225° F., preferably 150 to 180° F. The solution produced is moved through recycle pump 26 in line 27 to cooler 28 where heat is removed so that the temperature of the solution recycled through recycle T 30, recycle line 36 and sampling station 45 has a temperature of about 100° F. At station 45 samples are removed from the recycle line for pH and specific gravity determinations. The recycled solution product passing through line 36 to the temperature responsive recycle rate of flow control valve 58 is metered on through mixing valve 13*a* at a rate determined by the effluent product temperature taken at point 61 near the outlet of neutralizer 21 so that the temperature control operates to vary the recycle rate.

As the large body of the recycled ammonium phosphate solution passes through mixing valve 13*a*, water and ammonia are introduced through specific gravity responsive metering means 13 and pH responsive metering means 16*a*, respectively, based upon pH and specific gravity determinations performed on samples taken from recycle line 36 at sampling station 45. The continuous flow of the large body of reacting medium from mixing valve 13*a* into the upper portion of neutralizer 21, where a thorough mixing of the molecular ammonium hydroxide with the ammonium phosphate solution continues and produces the basic reacting medium into which acid is introduced at a predetermined constant rate at a point within the neutralizer 21 remote from the point of introduction of ammonia. Continued mixing with nonstriated turbulence produces highly-dispersed reactions and neutralizations to form a stable ammonium phosphate solution, wherein the formation of mono and di-ammonium phosphates is minimized and the precipitation of impurities in crude wet process phosphoric acid is avoided.

Generally, the amount of pressure within the system may be substantial or relatively small as long as it is maintained within practical operating ranges. For example, pressure in the neutralizer effluent line 25 may be as little as 5 p.s.i.g. and recycle pump 26 can increase the pressure so that pressure indicator control point 31*b* in recycle line 36 would be about 50 p.s.i.g. However, it is believed that pressures as high as 150 p.s.i.g. are not excessive, providing equipment limitations are not exceeded. Similarly, if the pressure in effluent line 25 is about 5 p.s.i.g. and the pressure at pressure control point 31*b* is about 50 p.s.i.g., the downstream pressure from mixing valve 13*a* at the inlet or neutralizer 21 may be about 20 p.s.i.g. The ability to maintain and control pressures in conjunction with temperature control and product dawn off from recycle T 30 through pressure responsive drawn off metering means 31*a* all provide additional flexibility in the system which allows the production of a superior ammonium phosphate plant nutrient solution in a surprisingly simple method and system described herein.

Specific gravity and pH measuring and control means operate on samples taken from the recycle line 36 at sampling station 45 wherein the samples exit through line 46 and valve 47 to pH meter 39 which measures and transmits variations through conductor means 41*a* to pH amplifier 49, transducer 50, and pH controller 51. Variations are hydraulically communicated through means 51*a* to pH responsive metering means 16*a* located in line 16 which controls the amounts of ammonia introduced into the large body of reacting medium through mixing valve 13*a*.

Samples of recycled solution flow from pH meter 39 through line 48 to specific gravity measuring means 34 where the body of the gravity meter is filled to level control by level arm 34*b* which transmits level height through means 55 to the liquid level responsive valve 53 which returns the sample taken at station 45 to recycle line 36 at sample return point 53*a*. The sample to be returned moves through return line 54 and pump 52 to level responsive control valve 53.

Operating conditions, volumes of constituents, and product drawoff may be characterized in the following approximate schedules where a recycle temperature of about 100° F. and a pressure of approximately 50 p.s.i.g. are maintained at station 31*b*. Phosphoric acid will be introduced at point 24 in neutralizer 21 at a rate of about 6 gallons per minute to the large dynamic body of substantially basic ammonium phosphate solution. About 10.3 gallons per minute of water and about 5.2 gallons per minute of ammonia will be introduced through mixing valve 13*a* into the large body of the recycled ammonium phosphate at a point remote from and at a time prior to the introduction of acid within the reactor 21. The stable ammonium phosphate plant nutrient solution product having an N–P–K analysis of at least 10–34–0 is drawn off from recycle T 30 through line 31 by pressure responsive draw off means 31*a* at a rate of about 18.8 gallons per minute. The volumetric rate of flow of the recycled ammonium polyphosphate through recycle T 30 into recycle line 36 is about 92 gallons per minute. It is apparent from the foregoing that the flexibility of the system described resides in part at least in the ability to control temperatures, pressures, pH, and specific gravity while initially introducing ammonia and then acid at remote points into a large dynamic body of a substantially basic reacting medium wherein the acid is introduced to said basic medium in a manner which prevents the volatilization of the ammonia and minimizes hydrolysis and losses of the non-ortho forms of the phosphate material.

The following example illustrates the practice of my invention and demonstrates the effect of various control elements upon the analysis of the constituents in the final liquid fertilizer product.

Example 1

Water, ammonia, and acid were delivered to their respective storage tanks, shown in FIG. 2. The water to be introduced into the system was ordinary well water having a metallic content of less than 600 parts per million. The super concentrated phosphoric acid supplied to the system was produced from crude wet-process phosphoric acid by dehydration so that the insoluble metal complexes were sequestered to form soluble chelates and retained in the substantially poly acid solution. The acid contained 72.06% $P_2O_5$ by wt. and 60.4% pyro by wt. The system was charged and the circuits activated so that the specific gravity meter controlled the introduction of water to the aqua mixer and the pH meter controlled the introduction of ammonia to the aqua mixer. The specific gravity meter system was programmed to produce a recycle solution having a specific gravity of about 1.40 at 95° F. and the pH metering device was adjusted to produce a product having a pH of approximately 6.3. Acid flowed at a predetermined constant rate into the neutralizer. The resulting product was recycled and additional water, ammonia, and acid were continuously introduced into this system as required. The temperature was controlled by cooler 28 in combination with the rate of recycling so that the temperature of the neutralizer effluent was maintained within the range of about 150–180° F. The liquid ammonium polyphosphate product drawn off this system was analyzed and yielded a 10.04–33.5–0 liquid fertilizer product which met the desired requirements. Losses of less than 1% of the poly forms occurred during the production of the liquid poly ammonium phosphate material.

While in the foregoing specification this invention has been described in relation to preferred embodiments thereof, and many details have been set forth for the purpose of illustration, it will be apparent to those skilled in the art that the invention is susceptible to other embodiments and that many of the details set forth herein can be varied considerably without departing from the basic principles of the invention.

I claim:

1. A continuous process for forming an aqueous ammonium phosphate composition stabilized by the presence of polyphosphate ions, comprising the steps of:

(a) continuously passing through an endless path preformed ammonium phosphate composition containing said ions and having a temperature of about 70°–225° F. and a pH of about 5.8–6.3, thereby establishing a cyclic stream;

(b) continuously adding to said stream at different points predetermined amounts of aqueous ammonia and superphosphoric acid and creating a turbulence in the stream, whereby the aqueous ammonia and acid react to form a new quantity of said aqueous ammonium phosphate composition, said aqueous ammonia being added to said stream in advance of said superphosphoric acid; and (c) withdrawing downstream from the points of addition of said aqueous ammonia and superphosphoric acid a portion of the aqueous ammonium phosphate composition, said withdrawn composition having a temperature of about 70°–225° F. and a pH of about 5.8–6.3.

2. The process defined in claim 1 wherein said superphosphoric acid is selected from the group consisting of: wet process superphosphoric acid, a mixture of concentrated wet process phosphoric acid and wet process superphosphoric acid, and a mixture of concentrated wet process phosphoric acid and furnace grade superphosphoric acid.

3. The process defined in claim 1 wherein the rate of introduction of either the aqueous ammonia or the superphosphoric acid is controlled so that the pH, temperature, and specific gravity of the composition being withdrawn remains within a predetermined range.

4. In a continuous process for forming an aqueous ammonium phosphate composition containing polyvalent metal impurities, said impurities being sequestered by polyphosphate ions, the improvement comprising the steps of:

(a) continuously passing through an endless path preformed ammonium phosphate composition containing said ions and having a temperature of about 70°–225° F., a pH of about 5.8–6.3, and a specific gravity of about 1.34–1.41 at about 100° F., thereby establishing a cyclic stream;

(b) continuously adding to said stream at different points aqueous ammonia and wet process superphosphoric acid and creating a turbulence in the stream, whereby the aqueous ammonia and acid react to form a new quantity of said aqueous ammonium phosphate composition which contains sequestered metal impurities, said aqueous ammonia being added to said stream in advance of said acid, and the amounts of aqueous ammonia and acid added being small in volume relative the stream so that the temperature of the stream stays at about 70°–225° F. with the addition of said aqueous ammonia and acid; and (c) withdrawing downstream from the points of addition of said aqueous ammonia and wet process superphosphoric acid a portion of the aqueous ammonium phosphate composition, said withdrawn composition having a temperature of about 70°–225° F., a pH of about 5.8–6.3, and a specific gravity of about 1.34–1.41 at about 100° F.

References Cited

UNITED STATES PATENTS

| | | | |
|---|---|---|---|
| 3,008,801 | 11/1961 | Adams | 23—107 |
| 2,843,138 | 7/1958 | Gilman | 137—93 |
| 3,015,552 | 1/1962 | Striplin et al. | 71—41 |
| 3,044,851 | 7/1962 | Young | 23—107 |
| 3,264,085 | 8/1966 | Hignett et al. | 71—34 |
| 3,293,320 | 12/1966 | Magearl et al. | 260—683.59 |

HERBERT T. CARTER, Primary Examiner

U.S. Cl. X.R.

23—259, 260; 71—34, 41, 43